United States Patent [19]
Bishop

[11] Patent Number: 6,005,149
[45] Date of Patent: Dec. 21, 1999

[54] METHOD AND APPARATUS FOR PROCESSING ORGANIC MATERIALS TO PRODUCE CHEMICAL GASES AND CARBON CHAR

[75] Inventor: Norman G. Bishop, Woodville, Tex.

[73] Assignee: Engineering, Separation & Recycling, Ltd. Co., Waxahachie, Tex.

[21] Appl. No.: 09/135,829

[22] Filed: Aug. 18, 1998

[51] Int. Cl.⁶ ............................... C10G 1/00; C10J 3/06; C10J 3/48; C10B 1/04

[52] U.S. Cl. .......................... 585/241; 585/240; 585/242; 201/4; 201/27; 201/28; 201/30; 201/36; 208/132; 208/400; 202/209; 202/216; 48/127.1; 48/123; 48/127.3; 48/197 R

[58] Field of Search .................................. 585/240, 241, 585/242; 201/2.5, 4, 27, 28, 30, 36; 208/132, 400; 202/209, 216; 48/197 R, 123, 127.1, 127.3; 423/247, 248, 215.5

[56] References Cited

U.S. PATENT DOCUMENTS

| | | |
|---|---|---|
| 1,270,949 | 7/1918 | Hornsey . |
| 1,677,758 | 7/1928 | Frank . |
| 2,805,188 | 9/1957 | Josenhans . |
| 3,639,111 | 2/1972 | Brink et al. . |
| 3,759,677 | 9/1973 | White . |
| 3,842,762 | 10/1974 | Sargent et al. . |
| 3,874,116 | 4/1975 | White . |
| 3,938,449 | 2/1976 | Frisz et al. . |
| 3,990,865 | 11/1976 | Cybriwsky et al. . |
| 4,063,903 | 12/1977 | Beningson et al. . |
| 4,178,266 | 12/1979 | Burkert et al. . |
| 4,308,103 | 12/1981 | Rotter . |
| 4,318,713 | 3/1982 | Lee et al. . |
| 4,361,100 | 11/1982 | Hinger . |
| 4,441,892 | 4/1984 | Schuster . |
| 4,591,362 | 5/1986 | Yudovich et al. . |
| 4,758,268 | 7/1997 | Bishop et al. ............... 75/25 |
| 4,840,129 | 6/1989 | Jelinek . |
| 4,963,182 | 10/1990 | Bishop et al. ............. 75/590 |
| 4,976,210 | 12/1990 | Dewald . |
| 4,983,214 | 1/1991 | Bottinelli et al. . |
| 5,028,304 | 7/1991 | Bishop ............................ 266/150 |
| 5,425,792 | 6/1995 | Bishop et al. . |
| 5,584,255 | 12/1996 | Bishop et al. ............ 110/235 |
| 5,656,044 | 8/1997 | Bishop et al. .......... 48/197 R |
| 5,851,246 | 12/1998 | Bishop et al. ............ 48/112 |

FOREIGN PATENT DOCUMENTS

27 48 785  5/1978  Germany .

*Primary Examiner*—Bekir L. Yildirim
*Attorney, Agent, or Firm*—Jones, Day, Reavis & Pogue

[57] ABSTRACT

The invention provides a practical and efficient method and apparatus for thermally processing organic based raw materials of either primary or secondary (recycled) origin, in order to extract volatile organic vapors and to selectively produce either condensable hydrocarbon gases or, more preferably, non-condensable synthesis gases that are rich in hydrogen and carbon monoxide for use as a raw material in chemical processes, or as a fuel. In particular, the invention provides a single rotary reactor having two contiguous hearth reaction areas, i.e., a drying and volatizing area and a reformation area, the areas being separated from each other by a bed-retaining refractory weir. The weir has an aperture for fluidly connecting the two hearth reaction areas of the single reactor. In each of the two reaction areas, the temperature, pressure, and chemical characteristics of the internal gaseous atmosphere can be selectively controlled to achieve the degree of volatizing, cracking, dissociation and/or reforming of vaporous hydrocarbon gases required to meet the desired operating objective. Thus, a variety of synthesis gases having differing degrees of richness in hydrogen and carbon monoxide may be produced in a single reactor, eliminating the need for a downstream secondary reformation or "finishing" reactor.

44 Claims, 2 Drawing Sheets

METHOD AND APPARATUS FOR PROCESSING ORGANIC MATERIALS TO PRODUCE CHEMICAL GASES AND CARBON CHAR

BACKGROUND OF THE INVENTION

The invention relates to a method and apparatus for melting, smelting, boiling, vaporizing, fuming, and/or charring primary or secondary (recycled) organic materials from natural, commercial or societal sources for the purpose of extracting volatile organic vapors and producing a carbon rich residual char. The invention is particularly applicable for selectively and controllably producing either an unreformed pyrolysis gas rich in condensable hydrocarbon gases or, more particularly, a reformed synthesis gas rich in hydrogen and carbon monoxide and containing little or no condensable hydrocarbon gases, for use as a primary feedstock in chemical processes or as a fuel.

It has been known for many years that thermal processing (pyrolysis) of organic-based primary or secondary raw materials can be used to recover petroleum-like distillates (syncrude), synthesis gas (syngas) and a carbon enriched residue. For example, since the late 1700's, methods and apparatus, such as traveling grates, stoker grates, rotary kilns, shaft furnaces, beehive ovens, coke ovens, moving bed and static bed retorts, fluid bed reactors, pneumatic reactors, auger reactors, drag chain reactors, rotary hearth reactors, and the like, have been used for pyrolysis and/or gasification of coal and other raw materials that contain carbon, hydrocarbons and/or cellulose. However, after the discovery of large quantities of natural gas, and before the "energy crisis" of the mid-1970's, pyrolysis of raw materials was primarily used to produce charcoal or coke and, only secondarily, the by-product distillates and synthesis gases which were variously known as "producer gas", "water gas", "carburetted water gas", "blue gas", "coke oven gas" and "blast furnace gas". The commercial uses of these by-product gases were generally very limited unless it was possible for them to be used internally to supply heat for associated processes, to generate steam for a nearby power plant, or to be easily pipelined for use in public street lights. Thus, due primarily to unfavorable economy-of-scale and/or market location, very little use was made of these gases for chemical purposes in petroleum-rich areas of the world. The combination of rising environmental concerns in the 1960's concerning the safe disposal of domestic and industrial organic toxic wastes, and the energy crisis in the 1970's, stimulated interest in the development of new technologies for pyrolysis and gasification of organic waste materials that would concomitantly produce synthesis gases and/or distillates of syncrude gases usable as substitutes for petroleum.

The methods used for pyrolysis and/or gasification processes generally have in common the heating of raw feed materials that contain carbon, hydrocarbons and/or cellulose compounds to high temperatures in an oxygen starved or oxygen controlled atmosphere. Pyrolysis processes, by design, require the process to be practiced in some type of air tight indirectly heated retort in order to prevent contamination of the resulting pyrolysis gases with nitrogen, carbon dioxide and water vapor, which could result due to leakage or the entry of uncontrolled air into the retort. Consequently, in order to achieve an acceptable and efficient level of heat transfer via indirect heating, it is common to construct such vessels with high alloy metals that do not require insulation and/or refractory protection. However, such metallic retorts, or other vessels without insulation and/or refractory, have an inherent temperature limit to which they can be repeatedly heated without suffering damaging structural deterioration. The operational temperature limit reduces the ability of indirectly heated retorts to efficiently heat the feed material above about 500° C. to 650° C.

While organic feed material can be pyrolyzed at these temperatures, heating restrictions inherent in the design of indirectly heated retorts places limitations on their size which, in turn, can critically limit both efficiency and economics. In order to convert the pyrolysis gas formed in these retorts into a stable non-condensable gas suitable for use as fuel or as a primary feedstock for chemical processes, it is necessary to heat the hydrocarbon vapors to temperatures between 700° C. and 1000° C. and to crack and/or dissociate them to form synthesis gas in a secondary processing system downstream of the pyrolysis retort. Further, the resulting pyrolysis gas from such retorts contains a large quantity of complex hydrocarbons that recondense when the gases are cooled below their vapor temperature. Thus, downstream gas-processing equipment must be provided for handling the condensation of hydrocarbon liquids and separating these from the remaining synthesis gas.

U.S. Pat. No. 5,425,792 discloses a process in which gasification of organic materials is carried out in a primary tumbling reactor with an interior refractory lining, and having a single reaction zone and an oxygen/fuel burner with a high flame temperature positioned only at the discharge end of the reactor. The process burner inside the reactor is balanced in positioning and capacity in such a way that it is capable of delivering the necessary heat for thermally decomposing the organic materials to evolve pyrolysis gases containing complex hydrocarbons and to thermally crack and dissociate the evolving gases (at 650° to 800° C.) by the products of combustion of the burner to produce a synthesis gas containing less than about two percent by volume of gases with a molecular structure having more than two carbon atoms. However, in order to further reform methane and two carbon or greater ($+C_2$) hydrocarbons or carbon dust particles remaining in the synthesis gas, to produce a higher quality synthesis gas that is richer in carbon monoxide and hydrogen, the process requires a secondary "finishing" reactor with a secondary finishing gas (burner) stream positioned downstream from the primary reactor. The process is limited to no more than 10% excess oxygen relative to the molar content of the burner injected fuel.

In view of the foregoing, there is still a need to provide a safe, efficient and more versatile process and apparatus for pyrolysis and/or gasification of primary and secondary (recycled) organic materials to produce either an unreformed pyrolysis gas rich in condensable hydrocarbon gases, or a reformed synthesis gas rich in carbon monoxide and hydrogen gases and containing little or no condensable hydrocarbon gases.

SUMMARY OF THE INVENTION

The invention provides a method and apparatus for thermally processing organic based raw materials of either primary or secondary origin in order to extract volatile organic vapors and to selectively produce either condensable hydrocarbon gases, or non-condensable synthesis gases that are rich in hydrogen and carbon monoxide for use as a primary feedstock in chemical processes or as a fuel. The invention provides environmentally safe, efficient and versatile processing of natural or fabricated organic materials of single or mixed origin and of highly variable particle size and shape. These materials include, but are not limited to, primary or secondary materials from the petrochemical, polymer and plastics industries, non-metallic residues of automobile scrap, garbage and municipal waste, in solid, liquid, or sludge form, including cellulose-based materials, waste oils and solvents.

In particular, the invention provides a single rotating reactor that has two contiguous hearth reaction areas, i.e. a drying and volatizing area and a reformation area, separated from each other by an internal refractory weir that has an aperture for fluidly connecting the two reaction areas. In each of the two reaction areas, the temperature, pressure, and chemical characteristics of the internal gaseous atmosphere can be selectively controlled to achieve the degree of volatizing, cracking, dissociation, and/or reforming of vaporous hydrocarbon gases required to meet the desired operating objectives. Thus, for example, a variety of syn-crude gases and, more preferably, a variety of synthesis gases having differing degrees of richness in hydrogen and carbon monoxide (from about 15% to about 45% or more of each by volume), may be produced in a single reactor by varying the reaction conditions, without the need for a downstream secondary reformation or "finishing" reactor.

By the method of the invention, organic feed material is mechanically metered into the drying and volatizing area of the reactor and quickly heated to a temperature of about 500° C. to about 600° C. by heat transfer methods that preferably include at least one direct fired primary volatizing burner. The organic feed material is retained in the drying and volatizing area by the internal refractory weir, and mixed with previously heated residual solid matter in a common bed of matter until the new feed material is completely dried and volatized. The dried and volatized residual solid matter and resulting process gases then pass over and through the aperture of the refractory weir into the reformation area of the reactor. The aperture of the weir is set high enough for the weir to retain the solid residual bed matter in the drying and volatizing area of the reactor for a sufficient amount of time (e.g., about 30 to 60 minutes, depending on the speed of rotation of the reactor and the rate of feed of raw material into the reactor) to allow substantially complete drying and volatization to occur. Otherwise, the interior of the reactor is open and unobstructed to both the flow of solids and gases and to gas streams from both the primary volatizing burner and reformation burner (see below) and their combustion products.

The bed retaining refractory weir is an important feature of the rotary reactor of the invention because not only does it serve to restrain the flow of the bed to prevent premature movement of the material from the drying and volatizing area to the reformation area, but it also provides a sufficient bed depth to allow an inter-rotation of the bed material, which vastly increases the potential for heat transfer into the center of the bed. Preferably, the aperture of the refractory weir is set at a height that allows a working bed depth in the drying and volatizing area that is equal to at least 12% and up to 15% of the cross sectional area relative to the longitudinal axis of the rotary reactor. As used in the context of the invention, a "working bed" is the normal dynamic volume of bed material at any given time.

In the reformation area of the reactor, the temperature of the process gases and the residual solid matter is elevated from about 600° C. to a selected temperature as high as about 1000° C., by means of at least one high temperature reformation burner and/or at least one water-cooled or gas-cooled (or the like) oxygen injection lance. The selected temperature is sufficient to affect the composition equilibrium of the hot process gases to cause the complex organic gases to crack, dissociate, reform or stabilize as hydrocarbon and synthesis gases. As used herein below, the term "oxygen injection lance" refers to a cooled oxygen injection lance, such as those that are cooled by water or by gas or by other means known to those skilled in the art.

The reformation burner and oxygen injection lance are positioned above the bed of residual solid matter and produce a high temperature stream of combustion products, initially composed of carbon dioxide and water vapor, by direct combustion of either injected fuel(s) or by partial combustion of in situ process gases. The level of input energy from the primary volatizing burner, the reformation burner and the oxygen injection lance are controllable in order to produce the high temperature energy and/or process oxidizing agents (carbon dioxide and water) that are needed to maintain or reform the organic gases and achieve the equilibrium composition that meets process objectives. The level of combustion products from the primary volatizing burner, the reformation burner and the oxygen injection lance are controlled such that they are always sub-stoichiometric relative to the available free oxygen contained in the atmosphere of the drying and volatizing area, as well as the reformation area.

The mass flow rate of the heated bed of residual solid material through the single reactor is controlled by the rotational speed of the reactor, the height at which the aperture of the weir is set, and gravity. On the far side of the weir, in the reformation area, the bed material quickly flows as a relatively thin, semi-fluid bed of residual solid matter through the area and is subjected to rapid heating by the high temperature flame(s) from either or both the reformation burner and the oxygen injection lance, to the temperature level necessary to complete the volatizing of volatile organic matter, charring of the remaining carbon matter, smelting of residual metal oxides, and vaporizing residual heavy metals.

The hot process gases and hot residual solid matter are discharged from the discharge end of the reformation area of the reactor, preferably through insulated ducts and/or conduits that provide atmospheric protection, and into separate downstream cooling and final processing systems, such as gas cleaning, solid matter packaging systems, and the like.

DETAILED DESCRIPTION OF THE INVENTION

Figure 1:
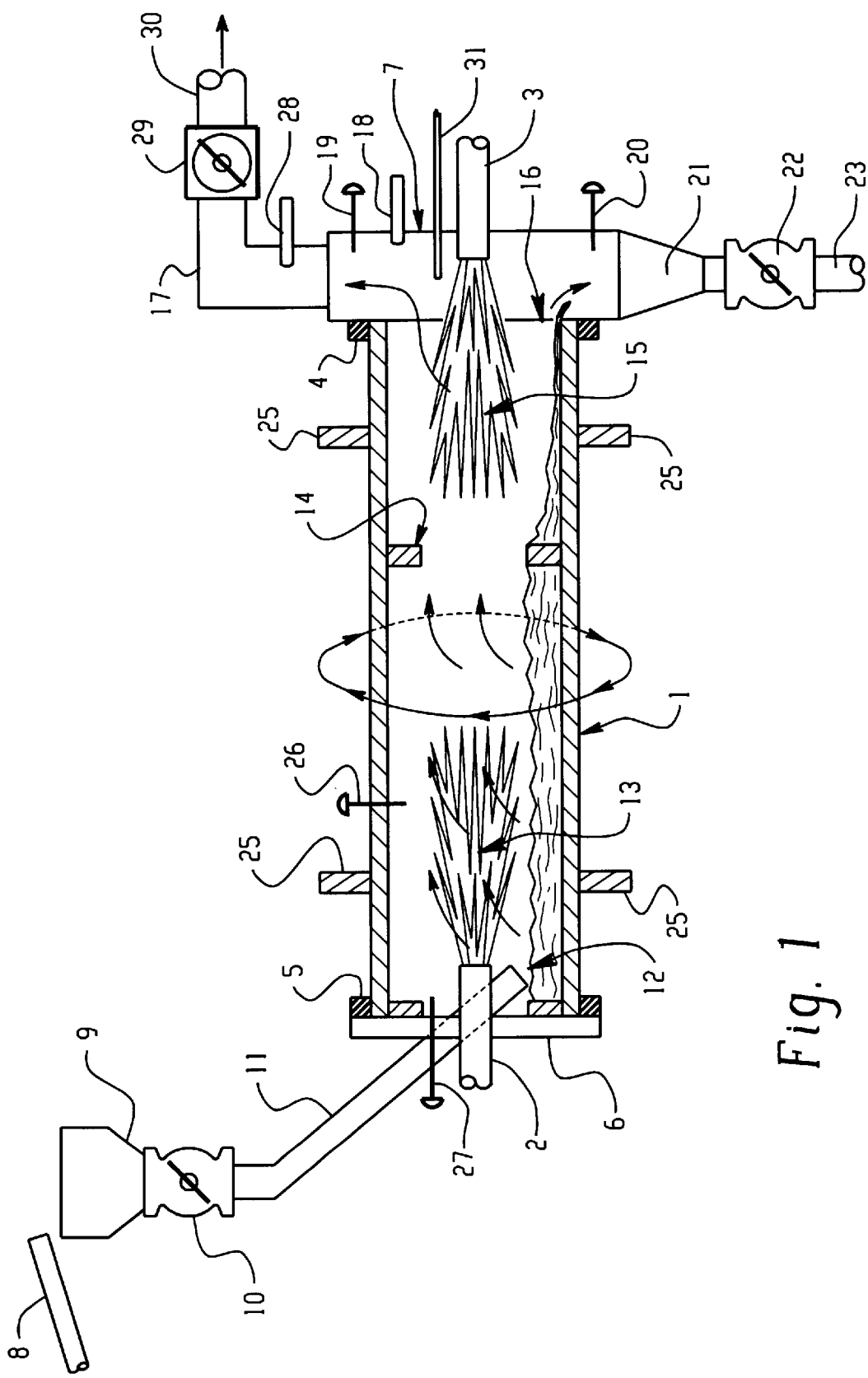
FIG. 1 is a schematic cross sectional view of a preferred embodiment of the present invention in which the methods of the invention may be practiced for gasifying organic materials.

The invention is directed toward environmentally safe and efficient processing of natural or fabricated organic materials of single or mixed origin and highly variable particle size and shape. Suitable materials include, but are not limited to, primary or secondary materials from the petrochemical, polymer and plastics industries, non-metallic residues of automobile scrap, garbage and municipal waste, in solid, liquid, or sludge form, including cellulose-based materials, waste oils and solvents. Table 1, for example, illustrates a proximate and ultimate analysis (before processing) of the average composition of a typical automobile shredder residue (ASR) that could be used as raw feed material in the process of the invention. A second proximate and ultimate analysis of potential feed material (raw municipal waste) for the process of the invention is illustrated in Table 2.

The invention provides a single reactor having two contiguous hearth reaction areas, i.e., a drying and volatizing area and a reformation area, and a bed retaining radial refractory weir located between, and common to, the two reaction areas. The weir has an aperture for fluidly connecting the two hearth reaction areas of the reactor. The single reactor of the invention may be operated to produce either hydrocarbon gases containing condensable hydrocarbons that are removable by subsequent distillation into liquid form downstream from the reactor, or synthesis gases that are refined within the reformation area of the single reactor into gases of near chemical quality.

Thus, a synthesis gas of a desired chemical composition may be produced and reformed within a single reactor, without the need for a downstream secondary reformation or "finishing" reactor. Moreover, by precisely controlling the temperature, pressure and chemical characteristics of the input burner(s), and the gaseous atmosphere in the two reaction areas of the single reactor, the design equilibrium chemical composition of the synthesis gas may be obtained regardless of the nature (pure or mixed) of the beginning raw feed materials. Following distillation and/or filtration or scrubbing downstream of the reactor, the product synthesis gas is clean, non-condensable and essentially free of dust, acids, metals and halogens.

Although the invention may be practiced in another type of vessel by one skilled in the art of pyrolysis and gasification, the preferred reactor in which the invention is most easily and preferably practiced is a rotary reactor that revolves around its longitudinal axis and is disposed either horizontally or with an incline with respect to its axis of rotation. Regardless of its orientation, the rotary reactor is constructed such that the feed end of the reactor comprises a 30° to 45° cone. Thus, the feed material is tumbled forward by the angle and elevation of the cone toward the discharge end, even if the rotary reactor is horizontally disposed. The mass flow rate of a bed of heated solid matter through the single reactor is controllable by the rotational speed of the reactor, the set height of the aperture of the weir, and gravity.

TABLE 1

Analysis of Typical Automobile Shredder Residue (ASR)

| Average Proximate Analysis | | Average Ultimate Analysis | |
|---|---|---|---|
| Composition[(1)] | Weight % | Composition[(2)] | Weight % |
| H$_2$O | 10.0 | Carbon | 27.8 |
| Volatile Matter | 43.0 | Hydrogen | 4.0 |
| Fixed Carbon | 3.0 | Nitrogen | 0.9 |
| Ash | 43.0 | Oxygen | 17.0 |
| Sulfur | 0.4 | Sulfur | 0.3 |
| Chlorine | 3.4 | Chlorine | 0.5 |
| | | Ash/Other | 49.5 |
| Total | 100.0 | | 100.0 |
| Btu/pound ASR | 5,070 | | |

[(1)]Shen, Z. et al., Ultrapyrolysis of Automobile Shredder Residue, The Canadian Journal of Chemical Engineering, Vol. 73, June 1995.
[(2)]Shen, Z. et al., Pyrolysis: An Acceptable Solution to the Auto Shredder Residue Problem?, Proceedings of Auto Recycling, 1994.

The entire reactor is insulated and refractory lined and, therefore, can be safely and repeatedly heated to internal temperatures up to 1000° C. without sustaining structural damage. The maximum allowable temperature is dependent on the lower fusion temperature of the associated inorganic solids. Rotary kilns of this type are well known to those skilled in the art. A typical rotary kiln suitable for use in the invention has a carbon steel shell lined with about 3 to 4 inches of insulation and about 6 to 9 inches of hot face refractory, sufficient to keep the temperature of the shell exposed to the outside atmosphere at an acceptable level.

TABLE 2

Proximate and Ultimate Analysis of Raw Municipal Refuse

| | Raw Municipal Refuse[1] | |
|---|---|---|
| | As Received (weight %) | Dry (weight %) |
| Proximate: | | |
| Moisture | 42.3 | 0.0 |
| Volatile Matter | 44.3 | 76.8 |
| Fixed Carbon | 5.6 | 9.7 |
| Ash | 7.8 | 13.5 |
| Total | 100.0 | 100.0 |
| Ultimate: | | |
| Hydrogen | 7.6 | 5.0 |
| Carbon | 27.2 | 47.3 |
| Nitrogen | 0.8 | 1.4 |
| Oxygen | 56.5 | 32.6 |
| Sulfur | 0.1 | 0.2 |
| Ash | 7.8 | 13.5 |
| Total | 100.0 | 100.0 |
| Btu/pound refuse | 5,310 | 9,180 |

[1]W. S. Sanner, C. Ortuglio, J. B. Walters and D. E. Wolfson. Conversion of Municipal and Industrial Refuse Into Useful Materials by Pyrolysis. USBM rep. of inv. 7428, 1970.

The reactor of the invention has at least two burners and at least one cooled oxygen injection lance for providing the thermal energy and combustion products necessary for the process(es). At least one primary volatizing burner is located in the feed end of the reactor to provide high temperature combustion products and energy for drying and volatizing the organic feed material, and at least one reformation burner is located in the discharge end of the reactor to provide additional high temperature energy and combustion products for heating the solid residual mass as well as the hydrocarbon-laden vapors and/or fumes entering the reformation area from the drying and volatizing area. While it would be possible to use other types of process burners, the type of burner most preferred by this invention is one that uses pure or near pure oxygen mixed with an appropriate gas, oil, or coal dust to provide the necessary process heat and atmospheric chemistry. Suitable oxygen/fuel burners for use in the invention method are available from commercial suppliers known to those skilled in the art. The process burners may be either water-cooled or gas-cooled or cooled by other means known to those skilled in the art. The oxygen injection lance(s) is/are employed to inject pure or near pure oxygen directly into the high temperature atmosphere of the fuel-rich (synthesis gas) reformation area when sufficient atmospheric temperature and combustible in situ gases are present. Suitable oxygen lances for use in the invention are available from commercial suppliers known to those skilled in the art.

By the method of the invention, the raw feed material, which preferably has a particle size that may range from about 12 inches down to dust size particles, is metered into the drying and volatizing area of the reactor through atmospheric locking devices that prevent the ingress of free air into, and the egress of hot process gases out of, the vessel. High temperature seals, known to those skilled in the art, are employed throughout the reactor to prevent seepage of air and gases and to maintain a desired pressure inside the reactor. The pressure in the reactor is preferably stabilized at between negative 1.0 and positive 1.0 inches of water gauge by means of a positive displacement pump that exerts a negative pressure on the reactor by pumping out gas, and a balancing positive pressure on the reactor by piping a small portion of clean pressurized gas back into the reactor, resulting in the desired negative to positive pressure balance. Preferably, the pressure is maintained slightly negative, in order not to pressurize the atmospheric seals any more than necessary.

In the drying and volatizing area of the reactor, the process temperature can be adjusted to any desired level by selectively adjusting the input of energy from the primary volatizing burner. Preferably, the raw feed material is quickly heated to temperatures of about 500° C. to 600° C. for the purpose of completely removing free moisture and vaporizing volatile organic matter from the raw feed material. As stated above, the preferred primary volatizing burner is an oxygen/fuel burner having the ability to operate with injected oxygen gas and fuel gas at ratios ranging from sub- to super-stoichiometry, depending on operating objectives. Preferably, the input burner gas ratios can be varied from 1.75:1 to as high as 10:1. Volatized organic gases emanating from the raw feed material may also be consumed by partial combustion with super stoichiometric oxygen injected when the flow of burner supplied fuel gas is reduced according to operating objectives.

The primary volatizing burner fires directly into the drying and volatizing area from the feed end of the reactor and is positioned within the reactor so as to avoid direct impingement of the flame with the bed material and hearth refractories in order to prevent carbonizing on the kiln walls or clinkering in the bed material. Clinkering and/or slagging of the residual solid matter is further prevented by precisely controlling the atmospheric temperature in the drying and volatizing area to prevent reaching the fusion temperature of the solid matter. The products of combustion (carbon dioxide and water vapor) from the primary volatizing burner, and the hydrocarbon-laden gases evolved from the bed of the feed material, flow in a co-current direction with the solid residual matter toward the reformation hearth area.

The evolved process gases and solid residual matter flow from the drying and volatizing area into the reformation area by passing through the aperture of the refractory weir, described above, which retains the solid residual bed matter in the drying and volatizing area for a sufficient amount of time to allow substantially complete drying and volatization to occur.

In the reformation area, the hydrocarbon-laden vapors entering from the drying and volatizing area are subjected to controlled temperatures that may be varied between 600° C. and 1000° C., the temperature being selected according to the operating objectives. The high temperature process energy is provided by the reformation burner which is located in the discharge end of the reactor and fires directly into the reformation reaction area. The burner is positioned within the reactor so as to avoid direct impingement of the flame with the residual solid materials and the hearth refractories in order to prevent carbonizing on the kiln walls or clinkering of the residual solid materials. Clinkering and/or slagging of the residual solid materials is further prevented by precisely controlling the temperature in the reformation area to keep it below the temperature for incipient fusion.

The temperature and atmospheric chemistry in the reformation area are controlled by the amount of high temperature energy and, consequently, products of combustion injected into that area by either the reformation burner or the oxygen injection lance. The reformation burner can be employed to provide the entire process energy needed in that area, or to act as a pilot burner (low fire) providing only a secure source of ignition when the oxygen injection lance is employed to provide the bulk of the necessary process energy and products of combustion. The reformation burner normally operates with an oxygen to fuel ratio of 2:1 (stoichiometric balance); however, it can be operated at oxygen to fuel ratios as high as 10:1. The oxygen injection lance can be employed to inject pure or near pure oxygen gas directly into the high temperature, energy rich gaseous atmosphere in the reformation area and thereby react directly with in situ combustible gases. Overall, the ratio of injected oxygen to injected fuel and/or in situ combustible process gas always remains strongly sub-stoichiometric in both the drying and volatizing area and the reformation area. The preferred method of operations is to use the reformation burner to preheat the rotary reactor and process gas handling systems before raw feed material is introduced into the reactor. After the start of the raw feed into the reactor, and after establishing proper operating temperatures and reaching desired chemical equilibrium in both the drying and volatizing area and the reformation area, the reformation burner firing rate may be incrementally reduced to the low fire level while systemically replacing the process energy needs by direct injection of oxygen into the reformation area via the oxygen injection lance.

The reformation burner and/or the oxygen injection lance fires its products of combustion in a counter-current direction relative to the flow of the process gases, and the dust and solids from the drying and volatizing area of the reactor, in order to thoroughly mix the products of combustion from the burner with the process gases. Thus, most of the process (hydrocarbon-laden) vapors become quickly and intensively mixed with very high temperature oxidizing agents ($CO_2$ and $H_2O$) from the reformation burner. The organic vapors are rapidly cracked, dissociated, and/or reformed into a synthesis gas that is rich in hydrogen and carbon monoxide, and little or no condensable hydrocarbon vapors remain in the gaseous product.

An important feature of the invention is that the process is capable of providing sufficient high temperature energy in the reformation area of the reactor to raise the temperature of the residual solids to such a level as to also complete the reduction of most metal oxides to their metallic states. Mixed metals, such as zinc, lead, cadmium, and the like, when mixed together in a molten state, will form a eutectic mixture that has a lower boiling point than the individual metals. Thus most, if not all, heavy metals contained in the solid residue melt, boil, and vaporize into the gaseous atmosphere in the reformation area. The gaseous metal vapors become mixed with the hot process gas and together they flow out of the reformation area into a gas scrubbing system located downstream from the reactor. As the gases begin to cool in the presence of carbon dioxide and water vapor, the gaseous heavy metals reoxidize to their oxide states as very fine particles of dust. This dust, along with other process dust, is separated from the synthesis gas and recovered by the gas scrubbing equipment.

Another important aspect of the methods and apparatus of the invention is that most, if not all, of the solid fixed carbon remaining in the residual bed matter passing from the drying and volatizing area into the reformation area of the reactor is converted to synthesis gas. By the process, the solid fixed carbon in the reformation area is sufficiently elevated in temperature, in the presence of water vapor (from either the inherent humidity in the reactor or water vapor formed as a combustion product [$CH_4 + 2O_2 \rightarrow CO_2 + 2H_2O$] by the reformation burner), to be subjected to water gas reactions to form carbon monoxide and hydrogen gas, according to the reactions $C + H_2O \rightarrow CO + H_2$ ($\Delta H = -31,380$ cal./mole C) or $C + CO_2 \rightarrow 2CO$ ($\Delta H = +41,220$ cal./mole C).

In another embodiment of the invention, it may be desirable to produce a lesser quality synthesis gas having a low amount of hydrogen and carbon monoxide gases to produce a gas that is rich in condensable hydrocarbons for subsequent distillation into liquid form. In this embodiment, the temperature of the reformation area is controlled by the oxygen/fuel ratio of the reformation burner to maintain the temperature of the evolved hydrocarbon-laden process gases, entering from the drying and volatizing area, in the range of 500° C. to 600° C. in order to stabilize the composition equilibrium characteristics of the hydrocarbon-laden gases at a temperature level sufficient to allow the gases to pass out of the reactor without significant reformation. The stabilized gases then flow without premature condensing to downstream equipment where hydrocarbon liquids can be safely distilled out of the remaining synthesis gas. The type of downstream gas handling system selected will depend on whether or not downstream distillation of "syncrude" liquids or the production of high quality synthesis gas is the primary objective of the process in the reactor. Such distillation systems are well known to those skilled in the art. In this embodiment, the solid residue exiting the process will be relatively high in fixed carbon.

The reactor in which the invention is practiced is illustrated in FIG. 1. Prior to starting the feeding of raw materials into the process, the reactor must be purged of free oxygen (air) to provide a non-oxidizing/inert gas atmosphere, and also pre-heated, as described above, to process temperatures in both hearth areas of the reactor and connecting gas handling systems. The primary volatizing burner and/or the reformation burner may be fired under stoichiometric or sub-stoichiometric conditions to provide the energy and atmospheric gases needed for pre-heating the hearth areas to a temperature of about 650° C. to 750° C., and for purposes of purging free oxygen (air) out of the reactor. Purging of the reactor and downstream gas processing system may also be accomplished by circulation of the waste combustion gases ($CO_2 + H_2O$) from the primary volatizing burner and/or the reformation burner. The recycled gases, which have been scrubbed and cooled to near atmospheric temperature, provide mass and volume, but not heat energy. The waste combustion gases are drafted from the reactor through the entire process system, including downstream gas handling and cleaning systems, by induction draft, thus purging the entire system of oxygen (air). Alteratively, the reactor may be purged of oxygen (air), but not necessarily preheated, by piping in and circulating other non-oxidizing/inert gases produced outside the reactor. Such non-oxidizing/inert gases could include nitrogen gas or carbon dioxide gas.

Referring to FIG. 1, which represents a preferred embodiment of the present invention, raw feed material of partial or total organic composition is metered into a holding hopper 9 by a metering and conveying device 8. The feed material is mechanically fed into a pre-heated, free oxygen-purged reactor 1 through an atmosphere locking rotary or double dump valve 10 and flows by gravity through the raw feed conduit 11 into the entrance area 12 of the drying and volatizing area 13 of the reactor 1. Depending on the nature of the selected feed material for the process, it may be necessary to employ feeders that have the ability to feed non-free flowing and/or sticky materials by mechanical means which are commercially available and well known to those practiced in the art.

By the rotating action of the reactor 1, discussed further below, the raw feed material is quickly mixed with previously heated bed of residual solid matter that resides in the drying and volatizing area 13 of the reactor 1. The residual matter is composed of particles and granules of inorganic matter and carbon char. Heat is quickly exchanged from the hot bed, apparatus walls, and gases in the atmosphere of the drying and volatizing area 13, into the new organic feed material. In the preferred embodiment, a primary volatizing burner 2 is employed directly inside the entrance area to offset the endothermic exchange of heat between the new material and the previously heated bed of residual solid matter. The products of combustion from the primary volatizing burner 2 plus the gases evolved from the new organic feed material flow in a co-current direction with the residual solid matter.

In a preferred embodiment, the reactor 1 is a rotary kiln fabricated from carbon steel and is lined inside by fire brick or similar quality castable refractories that are able to withstand the potentially damaging effects of both high temperature and/or chemical alteration. The supporting and rotating devices 25 of the reactor are of standard mechanical design and may be supplied by any number of commercial manufacturers of rotary kilns. The longitudinal axis of the reactor 1 may be disposed either horizontally or slightly inclined. The principal function of the reactor is to contain, mix and convey the material mass and generated gases from the feed end to the discharge end of the apparatus, while maintaining a protected high temperature atmosphere. Atmosphere seals 4, 5 are located between the rotating reactor 1 and the feed end hood 6, and the discharge end hood 7 fixed structures. These seals allow slippage between the rotating reactor and the non-rotating fixed structures without allowing ingress of atmospheric air into the process, or egress of hot process gases out of the processing apparatus into the plant work area. Such seals are commonly known and can be supplied by commercial manufacturers of rotary kilns.

At least one protected thermocouple 26, located at any convenient point along the shell of the reactor 1 and extending through the shell and fire brick into the inside atmosphere of the drying and volatizing area 13 is provided to allow monitoring of the atmospheric temperature in that area. Additionally, a control thermocouple 27 is located in the feed end hood 6 for the purpose of monitoring the temperature of the atmosphere at the entrance of the drying and volatizing area 13 and for controlling the primary volatizing burner 2 by means of feed-back electronic signals to burner controlling devices (not shown).

Once the raw feed material is introduced into the drying and volatizing area 13 of the reactor 1, the material is immediately subjected to the high temperature (500° C. to 600° C.) of both the previously dried and volatized residual bed material and the hot process gases in that area. The temperature within the drying and volatizing area 13 is maintained by very high temperature products of combustion generated by the primary volatizing burner 2, which is programmed to automatically control the burner combustibles at a level sufficient to maintain the desired temperature in the drying and volatizing area 13. The primary volatizing burner 2 may be of standard commercial design and may utilize any suitable source of fuel (including organic vapors residing within the atmosphere of the drying and volatizing area of the reactor) for direct combustion with either pure oxygen, or a suitable blend of oxygen and air (see below), as needed, to deliver the selected level of energy into the drying and volatizing area. Combustion may alternatively take place by blowing compressed air ($O_2+N_2$) through the burner into the reactor. However, this method is not preferred because the high nitrogen content in atmospheric air may greatly increase the gas volume and contaminate the synthesis gas with inert nitrogen gas. Combustion may also alternatively take place with a blend of natural air and pure oxygen and may achieve a lower process cost; however, as above, the added nitrogen from the air would have to be taken into consideration in design of the plant. The preferred combustion method of the invention employs pure oxygen, primarily to exclude the contaminating effect of nitrogen that would be introduced with air.

In the drying and volatizing area 13 of the reactor 1, the raw feed material is quickly heated above the boiling point of water and is freed of all non-combined water. Upon reaching the dry state, the feed material continues to be elevated in temperature to a level between 500° C. and 600° C. while remaining in the drying and volatizing area 13. Volatile matter contained in the raw feed material begins to volatize at about 120° C. and, by the time the solid mass of the feed material reaches a temperature of about 350° C., most, if not all, of the volatile matter contained in the original raw feed material is liberated to the vapor state. Some tar-forming hydrocarbons are more refractory and may not complete volatizing until the temperature of the solid mass exceeds about 450° C. A typical composition of the gaseous atmosphere in the drying and volatizing area 13 of the present invention is presented in Table 3.

Depending on the moisture content and type of feed material selected for the process, the primary volatizing burner 2 has the capacity to provide between 2.0 and 4.0 million Btu per hour per ton of raw feed material into the drying and volatizing area 13. For example, different types and densities of feed materials require more or less heat energy in order to reach the processing temperature, i.e., 500° C. to 600° C. The amount of ash in the feed material may also influence the level of burner energy required.

TABLE 3

Typical Composition of Gaseous Atmosphere in the Drying and Volatizing Area

| Approximate Composition | Volume % |
| --- | --- |
| $H_2$ | 20 |
| CO | 15 |
| $CH_4$ | 11 |
| $C_2H_2$ | 5 |
| $C_2H_4$ | 4 |
| $C_2H_6$ | 3 |
| $+C_3$ | 20 |
| $CO_2$ | 6 |
| $N_2$ | 1[1] |
| $H_2O$ | 15 |
| Total | 100 |
| Process Temperature | 500° C.–600° C. |

[1]In the case where no free air is used in the burner combustion process.

By the time the solid mass remaining as residue of the original raw feed material reaches the bed retaining refractory weir 14 in reactor 1, the temperature of the mass will reach a temperature between 500° C. and 600° C. and most, if not all, carbon remaining in the solid mass will be fixed.

Figure 2:
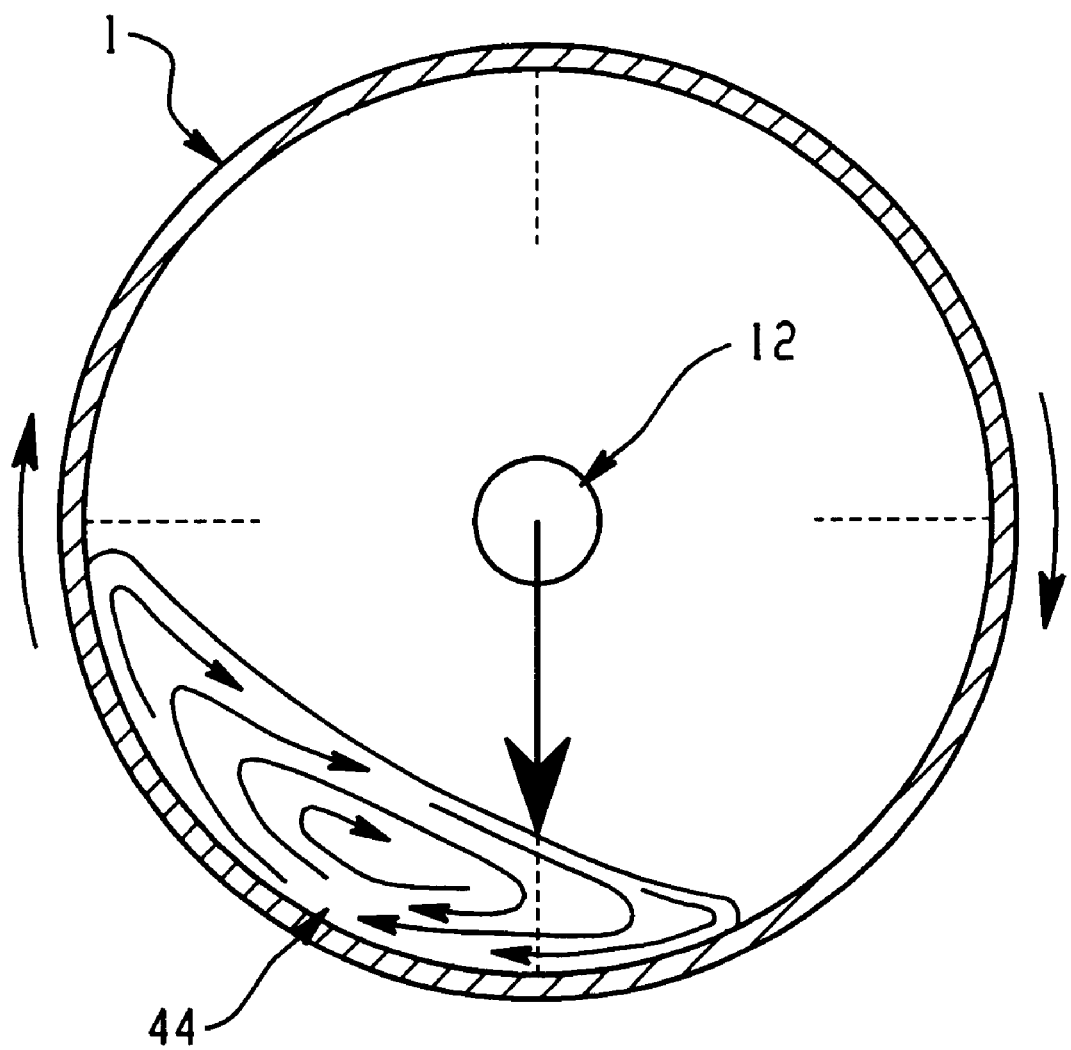
FIG. 2 is a schematic cross sectional view of the inter-rotation of the bed material in the rotary kiln.

The weir 14 is disposed substantially perpendicular to the longitudinal axis of the reactor 1 and is positioned along the longitudinal axis in such a location as to provide about 30 minutes to 60 minutes of retention time, depending on the speed of rotation of the reactor 1 and the rate of feed of raw material into the reactor. The depth of residual solid matter retained in the drying and volatizing area 13 is determined by the height (or aperture) of the weir 14. Generally, the aperture of the weir is set sufficiently high to allow a working bed depth in the rotary reactor 1 equal to about 12% to about 15% of the total available volume in the drying and volatizing area 13. This bed depth is an important factor in causing inter-rotation of the bed to provide uniform mixing of the bed materials and for achieving optimum processing capacity. Inter-rotation of the bed material 44, illustrated in FIG. 2, vastly increases the potential for heat transfer into the center of the rotating bed 42. Thus, fresh organic feed materials entering the drying and volatizing area 13 become quickly intermixed with hot residual matter due to the rotation action of both the material bed and the refractory hearth of the reactor.

The retention time of residual solid matter in the drying and volatizing area 13 should normally be between thirty and sixty minutes, depending on the relative content of hydrogen compared to carbon in the feed material. For example, polyethylene is easier to volatize than polybutadiene, which tends to form both gas and carbonaceous soot (or fume) that passes out of the drying and volatizing area 13 of the reactor 1 without undergoing significant water gas reactions due to the lower temperature and available water vapor in that area. However, such carbon soot, being of extremely fine particle size, is more readily subject to reactions with high temperature oxidizing agents (e.g, $CO_2$ and $H_2O$) and oxygen that is injected in the higher temperature atmosphere of the reformation area 15. Thus, in the reformation area 15, the temperature of both the solid mass and gas may be elevated from 600° C. to as high as 1000° C. As the process temperature is increased, more of the carbon soot will be partially or completely oxidized to a gaseous form, by reactions such as:

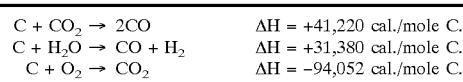

| | |
| --- | --- |
| $C + CO_2 \rightarrow 2CO$ | $\Delta H = +41{,}220$ cal./mole C. |
| $C + H_2O \rightarrow CO + H_2$ | $\Delta H = +31{,}380$ cal./mole C. |
| $C + O_2 \rightarrow CO_2$ | $\Delta H = -94{,}052$ cal./mole C. |

The residual solid mass passing from the drying and volatizing area 13, over the bed retaining weir 14, and into the reformation area 15 of the reactor 1, is further mixed and heated in the hearth 16 of the reformation area 15. Additional high temperature oxidizing agents ($CO_2$, $H_2O$ and $O_2$) are injected into the reformation area 15 by either the reformation burner 3 or the water- or gas-cooled oxygen injection lance 31 that are located in the discharge end of the reactor 1. The products of combustion of the reformation burner 3 are fired in a counter-current direction relative to the flow of both the gases and the solids from the drying and volatizing area 13 of the apparatus.

The partial oxidation reactions involving the reformation of hydrocarbon gas by high temperature products of combustion are illustrated in Table 4. The hydrocarbon-laden gases and/or fumes entering the reformation area 15 are largely composed of condensable complex hydrocarbon chains. At the high temperatures present in the reformation area 15, free oxygen may be present either due to an excess of oxygen from the reformation burner oxygen/fuel mixture, or from the injection of free oxygen directly into the reaction area through the oxygen injection lance 31. The free oxygen reacts first with the hydrogen and the lightest available hydrocarbon, which is usually methane, to form carbon dioxide and water vapor, in an exothermic reaction. Under the high temperature conditions of the flame front in the reformation

TABLE 4

Partial Oxidation Reaction Mechanisms[1]

$CH_4 + 1/2\ O_2 \rightarrow CO + 2H_2$   $\Delta H = -8,500$ cal
$CH_4 + CO_2 \rightarrow 2H_2 + 2CO$   $\Delta H = +59,100$ cal
$CH_4 + H_2O \rightarrow CO + 3H_2$   $\Delta H = +43,300$ cal Overall Reactions $CnHm + n/2\ O_2 \rightarrow nCO + m/2\ H_2$, and
$CnHm + nH_2O \rightarrow nCO + (n + m/2)\ H_2$ Secondary/Reaction Phases $CnHm + (n + m/4)\ O_2 \rightarrow nCO_2 + m/2\ H_2O$
$CnHm + nCO_2 \rightarrow 2nCO + m/2\ H_2$, and
$CnHm + nH_2O \rightarrow nCO + (m/2 + n)\ H_2$

[1]James R. Guseman, U.S. Steel Corporation. "Fuels and Reductants", Chapter 5, Direct Reduced Iron. The Iron and Steel Society, AIME, 1950. ISBN No. 0-89520-150-X.

area 15, both carbon dioxide and water vapor act as oxidizers that secondarily react endothermically with complex hydrocarbon-laden vapors and/or fumes to produce synthesis gases and less complex hydrocarbon gases. The less complex hydrocarbon gases are further oxidized by oxygen, carbon dioxide and/or water vapor to produce more carbon monoxide, hydrogen and carbon dioxide gases. The higher the temperature, the faster the partial oxidation reactions occur, and the more of the complex hydrocarbons are converted to carbon monoxide, hydrogen and carbon dioxide gases. Thus, by selectively controlling the temperature and gaseous atmospheric environment of the reformation area 15, the quality of the resulting non-condensable synthesis gases can be produced having higher heating values (HHV) of between about 275 and 402 Btu/standard cubic foot (Btu/scf) or an approximate chemical composition illustrated in Table 5. Because the evolved process gases are reformed into synthesis gases within a single reaction vessel, there is no requirement for a secondary reactor downstream of the primary reactor 1.

By the method of the invention, with the available atmospheric oxidants described above and the process temperature in the reformation area being maintained between 500° C. and 600° C., the resulting process gas comprises about 15% to about 20% by volume each of carbon monoxide and hydrogen, about 20% to about 25% hydrocarbon gases containing one to two carbon molecules, and about 15% to about 20% hydrocarbon gases containing more than two carbon molecules, as illustrated in Table 3. Similarly, with the available atmospheric oxidants described above and the process temperature in the reformation area being maintained between about 650° C. and 750° C., the resulting process gas comprises about 25% to about 35% by volume of each of carbon monoxide and hydrogen, about 10% to about 14% of hydrocarbon gases containing one to two carbon molecules, and about 1% to about 3% of hydrocarbon gases containing more than two carbon molecules, as illustrated in Table 5, A. Further, with the available atmospheric oxidants described above and the process temperature in the reformation area being maintained between about 750° C. and 1000° C., the resulting process gas comprises about 35% to about 45% by volume of each of carbon monoxide and hydrogen, about 2% to about 3% of hydrocarbon gases containing one to two carbon molecules, and less than 0.5% gases containing more than two carbon molecules, as illustrated in Table 5, B.

Preferably, the primary volatizing burner 2, the reformation burner 3, and the oxygen injection lance 31 utilize pure or near pure oxygen and, therefore, the nitrogen content of the resulting product gas is normally limited to only the nitrogen inherently contained and trapped in the organic feed materials. Thus, in the preferred embodiment, the nitrogen content of the product gas is normally less than 2.0 percent by volume.

The hot hydrocarbon-laden gases, fumes, and the residual solid mass enters the reformation area 15 from the drying and volatizing area 13 at a temperature between 500° and 600° C. In an embodiment of the invention where it is desirable to produce a lesser quality synthesis gas having a lower amount of hydrogen and carbon monoxide gases and to produce a gas that is richer in condensable hydrocarbons for subsequent distillation into liquid form and to produce a carbon-rich residual char, the temperature of the reformation area 15 is controlled by the reformation burner 3 to maintain the temperature of the atmospheric gases at about 600° C. in order to stabilize the composition equilibrium characteristics of the resulting hydrocarbon rich gas at a temperature level sufficient to allow the gas to pass out of the reactor and flow without premature condensing to water-condensing equipment (not shown) where complex hydrocarbonaceous liquids can be safely condensed or distilled out of the associated synthesis gas. The injection of the products of combustion from the reformation burner 3 determines and stabilizes the composition equilibrium.

If it is desirable to obtain higher quality non-condensable synthesis gases the temperature of the gases and the solid residual matter may easily be increased as high as 1000° C. for the purpose of reforming part or most of the hydrocarbon vapors and carbon soot (fume) and much of the carbon-rich solid residue, into synthesis gas (hydrogen and carbon monoxide). The reformation burner 3 and/or the oxygen injection lance 31 can be manipulated and controlled by the nature of the ratio and quantity of oxygen-to-fuel selected for the burner or lance to provide the high temperature energy and gaseous oxidants required to achieve an optimum level of composition equilibrium to meet operating objectives.

The residual mass remains in the reformation area 15 for only a few minutes before passing out of the reformation area of the reactor 1 through a solids collecting chute 21 and is metered out through a solids flow control device 22 that also serves as an atmospheric seal for the process. The flow control device may be any suitable type of rotary or double dump valve that is available from numerous commercial sources. The temperature of the exiting residual mass can be measured and monitored by a thermocouple 20 and the temperature of the reformation burner or lance adjusted accordingly. The hot solids evacuation duct 23 then conveys the residual mass of material via a connecting conduit to a cooling device. The methods and type of equipment needed to receive and cool the hot residual mass (char), as well as to further process the material by conveying, screening, bagging, briquetting, storing or otherwise handling the cooled mass as a final product, are well known to those practiced in the art and the equipment is readily available from commercial suppliers.

A thermocouple 19 is located in the discharge hood 7 near the entrance to the discharge duct 17 for the purpose of monitoring the temperature of the exiting gaseous mass and for transmitting electronic control signals to reformation burner 3 and/or oxygen injection lance 31 metering central equipment (not shown). Thus, the reformation burner and/or the oxygen injection lance can be programmed to automatically adjust as needed to maintain the temperature at a prescribed level in the reformation area. The ratio of input oxidants into the reformation burner 3 may also be programmed to maintain the design temperature and ratio of $CO_2$ to $H_2O$ to free $O_2$ required to reach the process temperature and degree of reformation required to meet operations objectives. The oxygen injection lance 31 is provided to inject pure or nearly pure oxygen gas directly into the reformation area, independently of the reformation burner. Thus, controlled amounts of pure or nearly pure oxygen may be injected by the oxygen injection lance directly into the reformation area to react by direct combustion with in situ combustible process gases for the purpose of providing part or all of the necessary process energy and equilibrium chemistry. In this embodiment of the invention, the reformation burner 3 is operated under reduced or low fire settings and under stoichiometric conditions to serve as a positive ignition source when the oxygen injection lance 31 is operated as the primary oxidant/energy input source.

The quality of the product gas can be monitored by taking gas samples through sample port 18 for volumetric analysis. Examples of typical analyses of stable, non-condensable product synthesis gases at two levels of reformation of the hydrocarbon vapors and fumes in the reformation area are illustrated in Table 5. When the temperature of the reformation area is maintained at about 650° C. to 750° C., the resulting synthesis gas (Composition A) comprises from about 30% to about 35% by volume of each of carbon monoxide and hydrogen gas, about 3.5% by volume of gases with a molecular structure having two carbon atoms, and about 1.5% by volume of gases with molecular structure having more than two carbon atoms.

For example, in a calculated heat/mass balance when the feed material is ASR having only 25% ash and 10% water content, the drying/volatizing burner would operate at a rate sufficient to supply about 2.65 mm Btu/hour/ton feed. The burner ratio ($O_2$ to fuel) could be set anywhere between 1.75:1 and 10:1, depending on operating objectives. To achieve this level of reformation (Composition A), between two million and three million Btu/hour input energy (depending on the composition of the feed material) is required per ton of feed material. The resulting synthesis gas will have a higher heating value (HHV) between 275 Btu/scf and 402 Btu/scf.

When a higher level of reformation is required (as illustrated in Composition B in Table 5), it is necessary to increase the reformation temperature from the 650° C./750° C. level to between 750° C. and 1000° C. This increase in temperature requires additional energy input in the reformation area 15 supplied by either (or both) the reformation burner 3 or the oxygen injection lance 31. The additional energy input is needed to raise both the residual solid matter and the process gas stream to the desired temperature. Under typical operating conditions, between one and three million Btu/hour additional energy input would be required per ton of feed, depending on the characteristics of the feed material. The resulting synthesis gas (e.g., Composition B) comprises a higher percentage by volume (about 35% to about 40% of each of carbon monoxide and hydrogen gas; however, the volume of gases containing two carbon molecules is reduced to less than 1%, while the volume of gases containing more than two carbon molecules is reduced to less than one half percent. The heating value (HHV) of Composition B gas is lowered to about 275 Btu/scf due to the reduction of hydrocarbon gas and increase in carbon monoxide and hydrogen gases. Although this gas could be used as a fuel for combustion purposes, its higher level of carbon monoxide and hydrogen makes the gas better suited for use as a feedstock for the commercial production of organic chemicals.

TABLE 5

Typical Composition of ASR Gas Samples Exiting the Reformation Area

| | Reformation Area Temp. ° C. | |
|---|---|---|
| | 650°–750° C. | 750°–1000° C. |
| Composition: | A | B |
| $H_2$ | 33.0% | 39.1% |
| CO | 30.0% | 35.9% |
| $CH_4$ | 8.5% | 1.4% |
| $C_2H_2$ | 0.5% | 0.2% |
| $C_2H_4$ | 2.7% | 0.2% |
| $C_2H_6$ | 0.3% | 0.2% |
| CxHy | 1.5% | 0.2% |
| $CO_2$ | 14.0% | 14.5% |
| $N_2$ | 1.5% | 1.3% |
| $H_2O$ | 8.0% | 7.0% |
| Total | 100.0% | 100.0% |
| Btu/scf | 402 | 275 |

The operating pressure in the reactor 1 and in the discharge hood 7 is controlled by a variable speed (or dampered) induction draft fan or blower (not shown) that is located downstream of a process pressure trim valve 29. A further embodiment of the pressure control includes the recycling of a controlled portion of the pressurized cooled and cleaned product gas back into the discharge hood through the recycle gas pipe 28. The recycled gas system also serves to stabilize the inert gaseous temperature, pressure, and atmosphere throughout the reactor, and the cooling, condensing, and gas cleaning systems, during the period of time that the systems are being pre-heated and prior to starting the feeding of raw feed material into the process. The product gas exiting through the process pressure trim valve is ducted 30 to and through several stages of gas cooling, condensing, and cleaning equipment that is well known to those practiced in the art and readily available from commercial suppliers of such equipment.

While the invention has been described herein with reference to the preferred embodiments, it is to be understood that it is not intended to limit the invention to the specific forms disclosed. On the contrary, it is intended to cover all modifications and alternative forms falling within the spirit and scope of the invention.

I claim:

1. A method for selectively producing condensable hydrocarbon gases and non-condensable synthesis gases from organic materials in a single reactor, comprising the steps of:

providing a single rotating reactor having a drying and volatizing hearth reaction area contiguous with a reformation hearth reaction area, and a refractory weir separating the two contiguous reaction areas, wherein the weir has an aperture for fluidly connecting the two reaction areas;

feeding an organic material into the drying and volatizing area;

heating the organic material in the drying and volatizing area to a temperature of about 500° C. to about 600° C.;

retaining the organic material as a rotating bed in the drying and volatizing area by means of the refractory weir until the material is substantially completely dried and volatized to form a hot process gas and a hot residual solid matter;

flowing the hot process gas through the aperture in the weir and into the reformation area;

flowing the hot residual solid matter over the weir to form a rotating bed of residual solid matter in the reformation area;

elevating the temperature of the hot process gas and the hot residual solid matter in the reformation area to a selected temperature of from about 600° C. to about 1000° C.;

thermally reforming the hot process gas to achieve a selected equilibrium gas composition; and discharging the hot gases and the hot residual solid matter from the reactor.

2. The method of claim 1, wherein the rotary reactor has a longitudinal axis and the refractory weir is substantially perpendicular to the longitudinal axis, and is positioned along said axis in a location such that the residual solid matter is retained in the drying and volatizing area for between about thirty minutes to about sixty minutes prior to flowing over the weir into the reformation area.

3. The method of claim 1, wherein the organic material is retained and mixed in a rotating common bed of previously heated residual solid matter in the drying and volatizing area.

4. The method of claim 3, wherein the rotary reactor has a cross sectional area and a longitudinal axis, and the aperture of the refractory weir is set at a height that allows a working bed depth in the drying and volatizing area that is equal to about 12% to about 15% of the cross sectional area relative to the longitudinal axis.

5. The method of claim 1, wherein the hot residual solid matter has a mass flow rate through the rotary reactor, wherein the mass flow rate is controlled by the speed of rotation of the reactor, the height of the weir, and gravity.

6. The method of claim 1, wherein the heating of the organic material in the drying and volatizing area is by a heat transfer means that includes at least one direct fired primary volatizing burner.

7. The method of claim 6, wherein the primary volatizing burner employs a direct combustion of oxygen gas and an injected burner fuel gas.

8. The method of claim 7, wherein the ratio of oxygen gas to burner fuel gas may range from about 1.75:1 to about 10:1.

9. The method of claim 6, wherein the primary volatizing burner provides a gas stream of combustion products that flows above the hot bed of residual solid matter toward the refractory weir in a co-current direction relative to the flow of the hot process gas and the flow of the hot residual solid matter.

10. The method of claim 9, wherein the combustion products comprise carbon dioxide and water vapor.

11. The method of claim 9, wherein the reforming step further comprises the step of controlling heat energy provided by the primary volatizing burner to achieve the selected temperature and a level of combustion products sufficient to reform the hot process gas to achieve the selected equilibrium gas composition.

12. The method of claim 1, wherein the heating of the organic material in the drying and volatizing area is by a heat transfer means that includes injecting controlled amounts of oxygen gas directly into the reactor, wherein the oxygen gas is available for direct combustion with in situ combustible process gases.

13. The method of claim 12, wherein the oxygen gas is injected by means of an oxygen injection lance.

14. The method of claim 12, wherein the injected oxygen gas is sub-stoichiometric relative to the level of the in situ combustible process gases.

15. The method of claim 12, wherein the combustion of oxygen gas and in situ combustible process gases produces a stream of combustion products that flows above the hot bed of residual solid matter toward the refractory weir.

16. The method of claim 1, wherein the step of elevating the temperature in the reformation area is by a heating means that includes at least one high temperature reformation burner.

17. The method of claim 16, wherein the high temperature reformation burner employs a direct combustion of oxygen gas and an injected burner fuel gas.

18. The method of claim 17, wherein the ratio of oxygen gas to burner fuel gas may range from about 2:1 to about 10:1.

19. The method of claim 1, wherein the thermally reforming step comprises producing a high temperature stream of combustion products above the rotating bed in the reformation area.

20. The method of claim 19, wherein the high temperature stream of combustion products flows in a counter-current direction relative to the flow of the hot process gases and the solid residual material.

21. The method of claim 19, wherein the combustion products are carbon dioxide and water vapor.

22. The method of claim 19, wherein the thermally reforming step further comprises the step of controlling heat energy provided by the reformation burner to achieve the selected temperature and a level of combustion products sufficient to maintain or reform the hot process gas to achieve the selected equilibrium gas composition.

23. The method of claim 1, wherein the step of elevating the temperature in the reformation area is by a heat transfer means that includes injecting controlled amounts of oxygen gas directly into the reactor, wherein the oxygen gas is available for direct combustion with in situ combustible process gases.

24. The method of claim 23, wherein the oxygen gas is injected by means of an oxygen injection lance.

25. The method of claim 23, wherein the injected oxygen gas is sub-stoichiometric relative to the level of the in situ combustible process gases.

26. The method of claim 23, wherein the combustion of oxygen gas and in situ combustible process gases produces a stream of combustion products that flows above the hot bed of residual solid matter toward the refractory weir.

27. The method of claim 23, wherein the heating means further includes a high temperature reformation burner, and the method further comprises the steps of controlling the reformation burner under stoichiometric conditions and reducing the firing rate of the reformation burner to a low fire level in order to provide a positive ignition source when the oxygen is directly injected into the reactor.

28. The method of claim 1, wherein the temperature of the residual solid matter in the reformation area is elevated to a level sufficient to complete the volatization of volatile organic matter and to char remaining carbon matter.

29. The method of claim 28, wherein the temperature of the residual solid matter in the reformation area is elevated to a level sufficient to smelt residual metal oxides and vaporize residual heavy metals.

30. The method of claim 1, wherein the temperature of the hot process gas is elevated in the reformation area to between about 600° C. and about 650° C. and the resulting synthesis gas comprises about 15% to about 20% by volume carbon monoxide, about 15% to about 20% by volume hydrogen, about 20% to about 25% by volume hydrocarbon gases containing one to two carbon molecules, and about 15% to about 20% by volume hydrocarbon gases containing more than two carbon molecules.

31. The method of claim 1, wherein the temperature of the hot process gas is elevated in the reformation area to between about 650° C. and about 750° C. and the resulting synthesis gas comprises about 25% to about 35% by volume carbon monoxide, about 25% to about 35% by volume hydrogen, about 10% to about 14% by volume hydrocarbon gases containing one to two carbon molecules, and about 1% to about 3% by volume hydrocarbon gases containing more than two carbon molecules.

32. The method of claim 1, wherein the temperature of the hot process gas is elevated in the reformation area to between about 750° C. and about 1000° C. and the resulting synthesis gas comprises about 35% to about 45% by volume carbon monoxide, about 35% to about 45% by volume hydrogen, about 2% to about 3% by volume hydrocarbon gases containing one to two carbon molecules, and less than 0.5% by volume hydrocarbon gases containing more than two carbon molecules.

33. The method of claim 1, further comprising the step of maintaining a selected pressure in the reactor by balancing the pressure equilibrium between a negative and a positive value.

34. The method of claim 33, wherein the pressure is maintained by recycling of a portion of a cleaned and pressurized synthesis gas.

35. The method of claim 1, further comprising the step of purging the reactor of free oxygen prior to feeding the organic material into the reactor.

36. The method of claim 1, further comprising the step of pre-heating the reactor prior to feeding the organic material into the reactor.

37. An apparatus for thermally processing organic materials to selectively produce condensable hydrocarbon gases and non-condensable synthesis gases, using a rotary reactor having a longitudinal axis and a feed end and a discharge end, comprising:

a drying and volatizing hearth reaction area adjacent to the feed end of the rotary reactor for heating, drying and volatizing organic materials to form a hot process gas and a hot residual solid matter;

a reformation hearth reaction area adjacent to the discharge end of the reactor, the reformation reaction area being contiguous with the drying and volatizing reaction area;

a refractory weir separating the two contiguous hearth reaction areas and having an aperture for fluidly connecting the two reaction areas, wherein the aperture of the weir is set at a height that is sufficient to retain a rotating bed of hot residual solid matter in the drying and volatizing reaction area for a period of time sufficient to substantially completely dry and volatize the organic material, and wherein the aperture of the weir allows the flow of the hot process gas and the hot residual solid matter from the drying and volatizing reaction area into the reformation reaction area;

at least one direct fired primary volatizing burner in the drying and volatizing area of the reactor, wherein the burner provides a gas stream of combustion products that flows above the rotating bed of solid matter; and at least one high temperature reformation burner at the discharge end of the reactor wherein the reformation burner provides a gas stream of combustion products that flows above the rotating bed of solid matter.

38. The apparatus of claim 37, wherein the rotary reactor revolves around the longitudinal axis.

39. The apparatus of claim 38, wherein the feed end of the reactor comprises a 30° to 45° cone.

40. The apparatus of claim 37, wherein the refractory weir is substantially perpendicular to the longitudinal axis of the rotary reactor, and is positioned along said axis in a location such that the residual solid matter is retained in the drying and volatizing area for between about thirty minutes to about sixty minutes prior to flowing over the weir into the reformation area.

41. The apparatus of claim 37, wherein the rotary reactor has a cross sectional area and the aperture of the radial refractory weir is set at a height that allows a working bed depth in the drying and volatizing area that is equal to about 12% to about 15% of the cross sectional area relative to the longitudinal axis.

42. The apparatus of claim 37, wherein the primary volatizing burner is at the feed end of the reactor and the gas stream of combustion products flows toward the weir in a co-current direction relative to the flow of the hot process gas and the flow of the hot residual solid matter.

43. The apparatus of claim 37, wherein the reformation burner is at the discharge end of the reactor and the gas stream of combustion products flows toward the weir in a counter-current direction relative to the flow of the hot process gas and the flow of the hot residual solid matter.

44. The apparatus of claim 37, further comprising at least one oxygen injection lance for injecting oxygen gas into the rotary reactor.

* * * * *